(12) United States Patent
Printezis et al.

(10) Patent No.: US 7,676,511 B2
(45) Date of Patent: *Mar. 9, 2010

(54) METHOD AND APPARATUS FOR REDUCING OBJECT PRE-TENURING OVERHEAD IN A GENERATIONAL GARBAGE COLLECTOR

(75) Inventors: Antonios Printezis, Burlington, MA (US); David L. Detlefs, Westford, MA (US); Fabio Rojas, Chelsea, MA (US)

(73) Assignee: Sun Microsystems, Inc., Santa Clara, CA (US)

( * ) Notice: Subject to any disclaimer, the term of this patent is extended or adjusted under 35 U.S.C. 154(b) by 349 days.

This patent is subject to a terminal disclaimer.

(21) Appl. No.: 11/340,940

(22) Filed: Jan. 27, 2006

(65) Prior Publication Data

US 2007/0180002 A1 Aug. 2, 2007

(51) Int. Cl.
*G06F 17/30* (2006.01)
(52) U.S. Cl. .................... 707/206; 711/100
(58) Field of Classification Search ................... 707/206
See application file for complete search history.

(56) References Cited

U.S. PATENT DOCUMENTS

| | | | |
|---|---|---|---|
| 6,560,773 B1 * | 5/2003 | Alexander et al. | 717/128 |
| 6,629,113 B1 * | 9/2003 | Lawrence | 707/206 |
| 6,799,191 B2 * | 9/2004 | Agesen et al. | 707/206 |
| 6,839,725 B2 * | 1/2005 | Agesen et al. | 707/206 |
| 6,892,212 B2 * | 5/2005 | Shuf et al. | 707/206 |
| 7,210,122 B2 * | 4/2007 | Shuf et al. | 707/206 |
| 2002/0019716 A1 * | 2/2002 | Agesen et al. | 702/83 |
| 2002/0133533 A1 | 9/2002 | Czajkowski et al. | |
| 2003/0212719 A1 * | 11/2003 | Yasuda et al. | 707/206 |
| 2004/0088277 A1 * | 5/2004 | Garthwaite | 707/1 |
| 2007/0174370 A1 * | 7/2007 | Detlefs et al. | 707/206 |

OTHER PUBLICATIONS

Jump, M., Blackburn, S., McKinley, K., "Dynamic Object Sampling for Pretenuring", ISMM '04, Vancouver, British Columbia, Canada, Oct. 24-25, 2004, pp. 152-162.

Harris, T., "Dynamic Adaptive Pre-Tenuring", Proceedings of the International Symposium on Memory Management, Oct. 15-16, 2000, 10 pages.

(Continued)

*Primary Examiner*—Neveen Abel Jalil
*Assistant Examiner*—Son T Hoang
(74) *Attorney, Agent, or Firm*—Osha • Liang LLP

(57) ABSTRACT

In some circumstances a generational garbage collector may be made more efficient by "pre-tenuring" objects or directly allocating new objects in an old generation instead of allocating them in the normal fashion in a young generation. A pre-tenuring decision is made by a two step process. In the first step, during a young-generation collection, an execution frequency is determined for each allocation site and sites with the highest execution frequency are selected as candidate sites. In the second step, during a subsequent young-generation collection, the survival rates are determined for the candidate sites. After this, objects allocated from sites with sufficiently high survival rates are allocated directly in the old generation.

15 Claims, 12 Drawing Sheets

OTHER PUBLICATIONS

Blackburn, S., Singhai, S., Hertz, M., McKinley, K., Moss, J., "Pretenuring for Java", OOPSLA '01, Tampa, Florida, Oct. 14-18, 2001, 11 pages.

Guyer, S., McKinley, K., "Finding Your Cronies: Static Analysis for Dynamic Object Colocation", OOPSLA '04 Vancouver, British Columbia, Canada, Oct. 24-28, 2004, 12 pages.

Jones, R. and Lins R., Garbage Collection: Algorithms for Automatic Dynamic Memory Management, John Wiley & Sons Ltd., 1996, Chichester, England, 399 pages.

Hirzel, M., et al., "Understanding the Connectivity of Heap Objects", ISMM '02, Berlin, Germany, Jun. 20-21, 2002, 14 pages.

* cited by examiner

METHOD AND APPARATUS FOR REDUCING OBJECT PRE-TENURING OVERHEAD IN A GENERATIONAL GARBAGE COLLECTOR

BACKGROUND

This invention relates to automatic reclamation of allocated, but unused memory, or garbage, in a computer system that uses a generational garbage collector and to methods and apparatus for reducing overhead resulting from object pre-tenuring decisions. Modern programming languages like the Java™ programming language or C# allow the use of automatic memory reclamation, or "garbage collection", which relieves programmers of the burden of explicitly freeing, or de-allocating, storage allocated to objects when the objects are no longer used, or reachable, by the application program. Memory reclamation may be carried out by a special-purpose garbage collection algorithm that "collects" memory by locating and identifying as free, dynamically assigned memory (called "heap" memory) that is unused, but has not been explicitly de-allocated. There are many known garbage collection algorithms, including reference counting, mark-sweep, mark-compact and generational garbage collection algorithms. These, and other garbage collection techniques, are described in detail in a book entitled "Garbage Collection, Algorithms for Automatic Dynamic Memory Management" by Richard Jones and Raphael Lins, John Wiley & Sons, 1996.

However, many of the aforementioned garbage collection techniques often lead to long and unpredictable delays because normal application thread processing must be suspended during the garbage collection process and these collectors at least occasionally scan the entire heap memory. For example, many modern applications have large live data sets, sometimes measured in gigabytes. Even on fast modern processors, collecting the entire heap in one atomic operation can take several seconds. Some applications require only minimizing the total garbage collection overhead and may be able to tolerate such delays. Other applications, such as real-time or interactive systems, where non-disruptive behavior is of greatest importance generally cannot use techniques which collect the entire heap in one operation and, thus, cause considerable disruption.

One conventional technique that has been used to reduce these delays is the use of generational garbage collectors that provide performance benefits over non-generational garbage collectors. Generational garbage collectors assume that applications observe a "weak generational" hypothesis, which is that most newly-allocated objects quickly become unreachable or "die". These garbage collectors take advantage of this hypothesis by concentrating garbage collections in an area of the memory heap, called the "young generation," in which all new objects are allocated. Such collections, called "minor" collections, are usually fast because the young generation is typically quite small and most objects in it are expected to be dead. Objects that survive a few minor collections are "promoted" or copied to an area of heap memory called an "old" generation. The old generation is eventually collected by "major" collections, which are typically slower because the old generation is typically larger than the young one. However, since most collections occur in the young generation, the overall delay introduced by garbage collection is reduced.

Pre-tenuring is a technique that identifies objects which are expected to be long-lived and allocates these directly into the old generation heap area. This direct allocation avoids the cost of copying the objects from the young generation to the old generation if the objects are later promoted. In garbage collectors that perform collections by copying objects out of the collected area, called "copying garbage collectors", pre-tenuring also avoids copying the objects during every minor collection.

A decision to pre-tenure an object is generally made at each allocation site for that object. Such an allocation site is a point in the application program code where the object is instantiated, thereby allocating memory space for the object. It is generally known that a particular allocation site tends to allocate objects of similar lifetimes. Thus, several known pre-tenuring methods dynamically decide at which allocation sites objects will be pre-tenured by performing some form of sampling on the allocated objects (at different granularities and using different techniques). The program code at such allocation sites is then modified to allocate the objects directly into the old generation.

One of the disadvantages of all the sampling techniques used by known pre-tenuring techniques is that they impose a small, but non-trivial, constant throughput overhead on the application. The least intrusive conventional techniques typically impose an overhead ranging between three and five percent and, in some applications, such an overhead is wasteful.

SUMMARY

In accordance with the principles of the present invention, a pre-tenuring decision is made by a two-step process. In the first step, dynamic profiling performed during execution of the application as part of the normal virtual machine operation is used to identify allocation sites that may be executed frequently; these allocation sites are then selected as candidate sites. In the second step, during a subsequent young-generation collection, the survival rates are determined for the candidate sites. After this, objects allocated from sites with sufficiently high survival rates are allocated directly in the old generation.

In one embodiment, the survival rate for a candidate site is determined by counting the bytes allocated by that site between young generation collections and using the number of those bytes that survive to determine the survival rate.

In still another embodiment, the bytes allocated by a site are counted by bytes allocated counting code that is generated when the allocation code is compiled for that site.

In still another embodiment, the bytes allocated counting code is bypassed when it is generated by the compiler and re-enabled only when the site is selected as a candidate site.

In yet another embodiment, the bytes allocated count that caused a site to be placed in a state in which it is not considered further for pre-tenuring is stored. If the survival rate of that site later increases, and the number of surviving bytes for that site becomes sufficiently large, that site is then reconsidered as a candidate site.

In still another embodiment, pre-tenuring decisions are reversed at regular intervals, changing the state of pre-tenured sites back to normal sites or perhaps directly to candidate sites.

In yet another embodiment where it is possible to distinguish between pretenured allocation and normal promotion allocation in the old generation, when the old-generation occupancy that will cause the old generation to be collected is approached, allocation counting for some set of pre-tenured allocation sites is re-enabled. After old generation "liveness" is determined, the surviving bytes are counted for each allocation site that is being sampling, in order to obtain a survival rate estimate.

In a further embodiment, surviving objects are counted by allocation in a young-generation-sized area of the old-generation that is being filled by allocation from pre-tenured objects. Instead of enabling counting when this area is filled however, this embodiment estimates the expected bytes surviving from the allocation and survival rates computed when the site was a candidate site and reverses the pre-tenuring decision if the actual amount surviving for a site is sufficiently smaller than the estimate.

DETAILED DESCRIPTION

Figure 1:
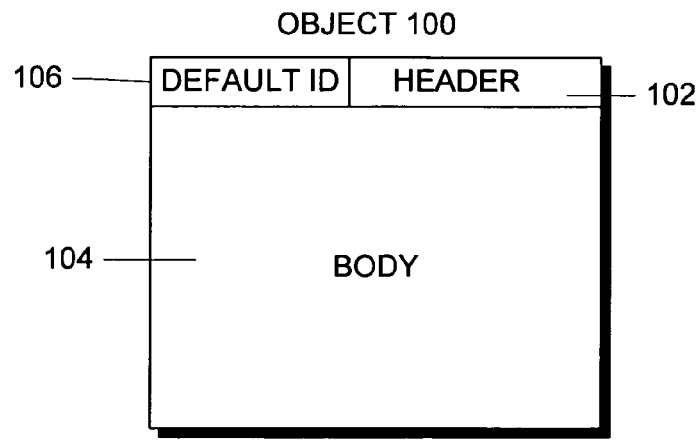
FIG. 1 is a block schematic diagram illustrating how a default site identifier inserted into an object header.

In accordance with the principles of the invention, allocation code that is generated by a compiler is modified to implement a pre-tenuring process. In order to do this, an assumption is made that each allocated object has a prefix called a "header" as well as a "body". This arrangement is illustrated in FIG. 1 in which object 100 has a header area 102 and a body 104. Typically, one portion of header area 102 is used to indicate the class of the object 100; the remainder of header area 102 may be used to record information on other object attributes, such as locking, hash codes, and the like.

In order to implement the invention, some portion of header 102 must be dedicated to allow an identifier for the allocation site that allocated the object to be recorded in selected objects. Since the header 102 typically includes class information, these identifiers need only be unique per class. However, initially, the selected portion of the header is set to a default site identifier 106. The actual value of the default site identifier is not important so long as it does not correspond to an actual allocation site identifier. As described below, and in accordance with the principles of the invention, the default site identifier will be changed to an actual site identifier, if the site is selected as a "candidate" site for pre-tenuring.

Figure 2A:
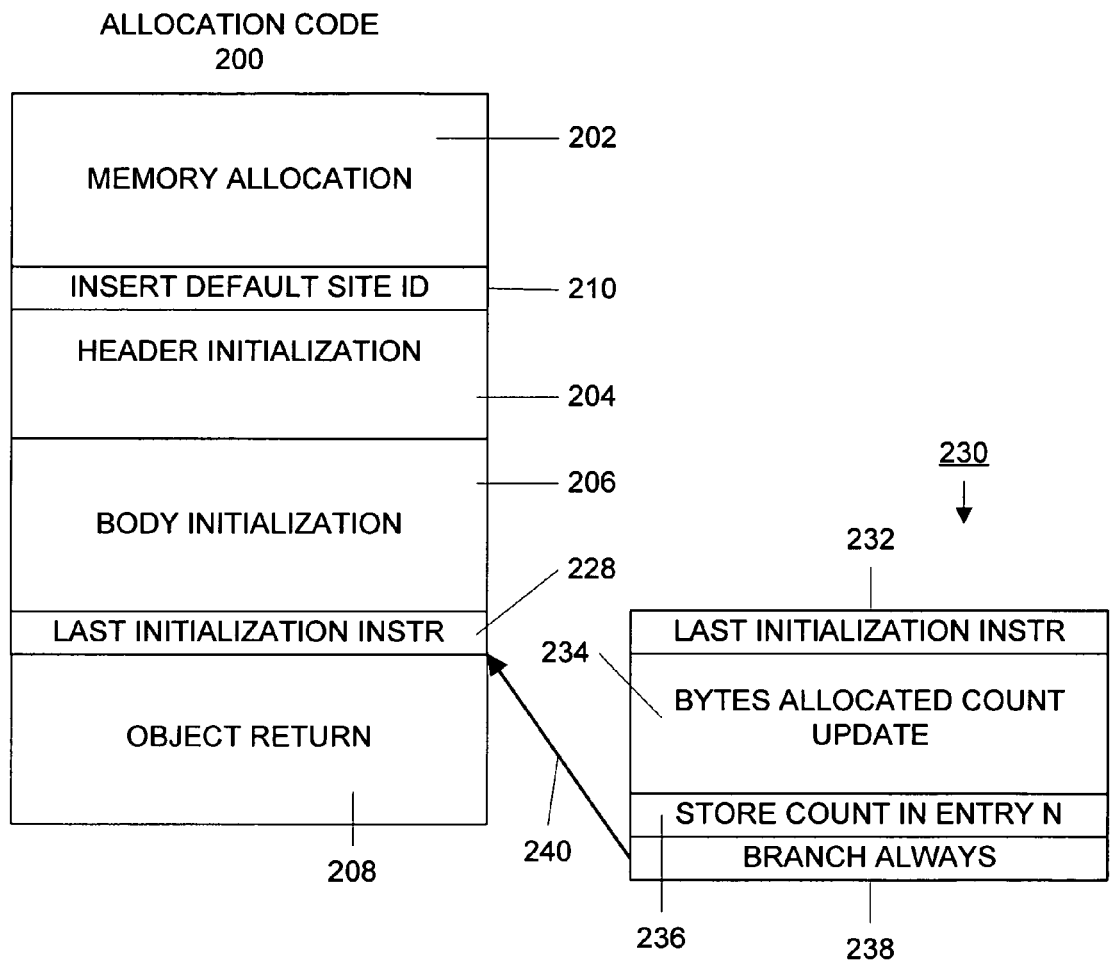
FIG. 2A is a block schematic diagram illustrating modifications that are made to object allocation code to count bytes allocated at a particular allocation site.
Figure 2B:
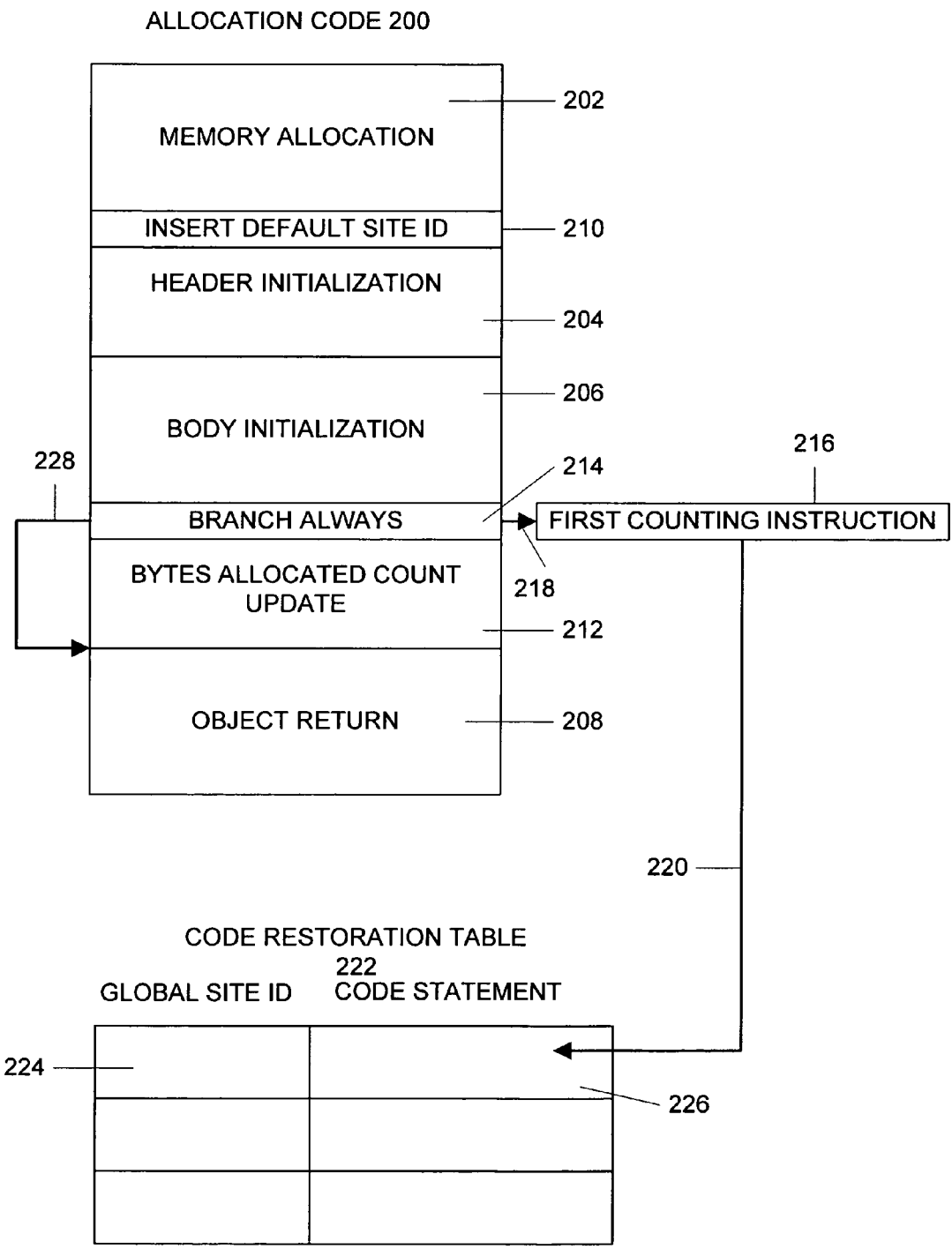
FIG. 2B is a block schematic diagram illustrating alternative modifications that are made to object allocation code to count bytes allocated at a particular allocation site.
Figure 3A:
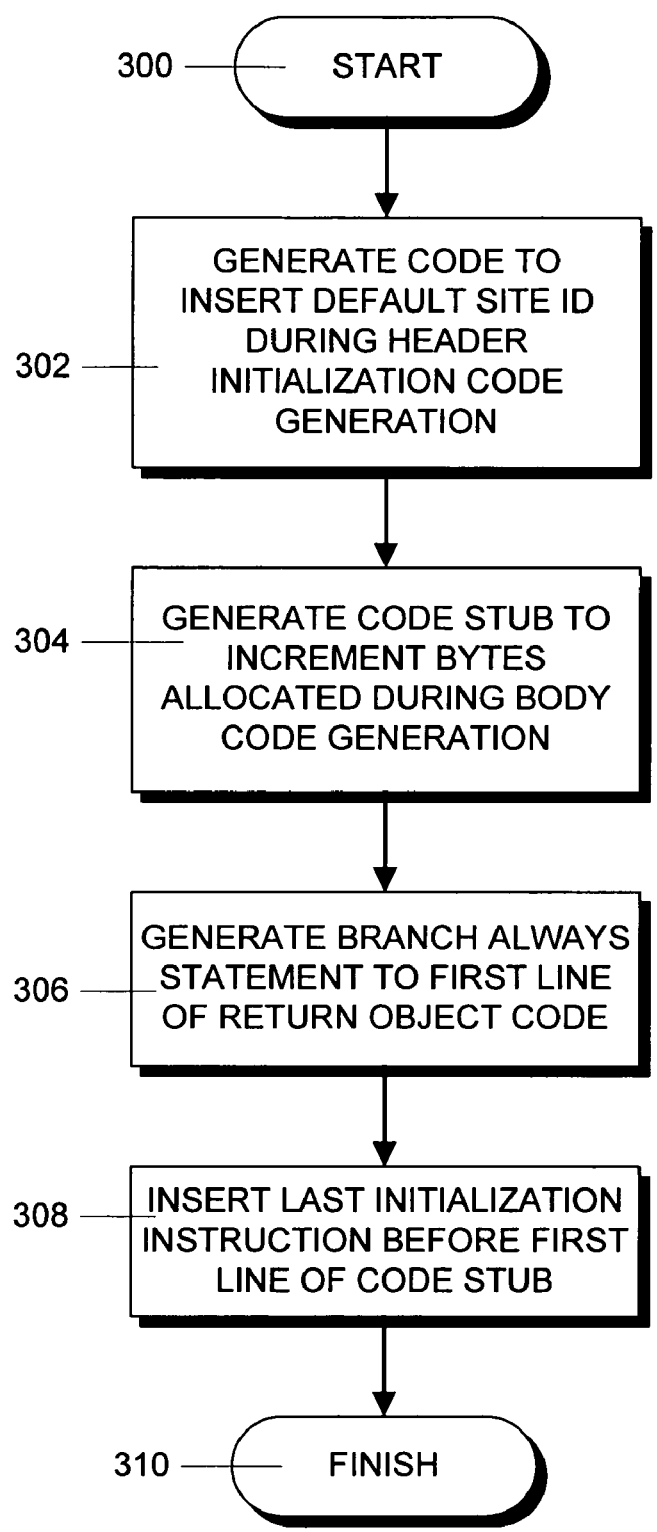
FIG. 3A is a flowchart showing the steps in an illustrative compilation process performed by a compiler to generate object allocation code for a particular allocation site.

When allocation code for an allocation site is JIT-compiled for the first time, the compiled code assigns the aforementioned default site identifier to the newly allocated object. Two alternative forms of this code are shown in schematic form in FIGS. 2A and 2B and the processes for generating the code are illustrated in the flowcharts shown in FIGS. 3A and 3B. Referring to FIG. 2A, allocation code 200 generally consists of four sections. These sections include a memory allocation section 202 which allocates memory space for the object, a header initialization section 204 that initializes the object header, a body initialization section 206 that initializes the object body, and an object return section 208 that returns a reference to the completed object to the calling method. The process for generating this code is shown in FIG. 3A and, as modified according to the invention, starts in step 300 and proceeds to step 302 where, in accordance with the principles of the invention, during the generation of the header initialization section 204, code 210 is generated which inserts the default site identifier into the object header. Since the object allocation code must initialize the header in any case, inserting the default site identifier into the object header does not add any appreciable overhead.

In step 304, a code stub 230 is generated containing code that updates the count of the number of bytes allocated at the allocation site identified by an allocation site ID which replaces the default site identifier in the object header if this site is selected as a candidate site for pre-tenuring. The operation of this code is described below. In some platforms care must be taken to ensure that the stub is sufficiently close to the main method body to allow for efficient branching. For example, it may be desirable that the location of the stub be expressible as an immediate constant that can be stored within the branch instruction. After generating this count update code 230, in step 306, a branch always instruction 238 is generated that returns control to the first instruction in the object return portion 208 of the allocation code 200 as schematically illustrated by arrow 240. Finally, in step 308, the last instruction 228 of the object body initialization code 206 is inserted as the first instruction 232 of the code stub 230. The process then finishes in step 310 after generating the object return code 208.

Figure 3B:
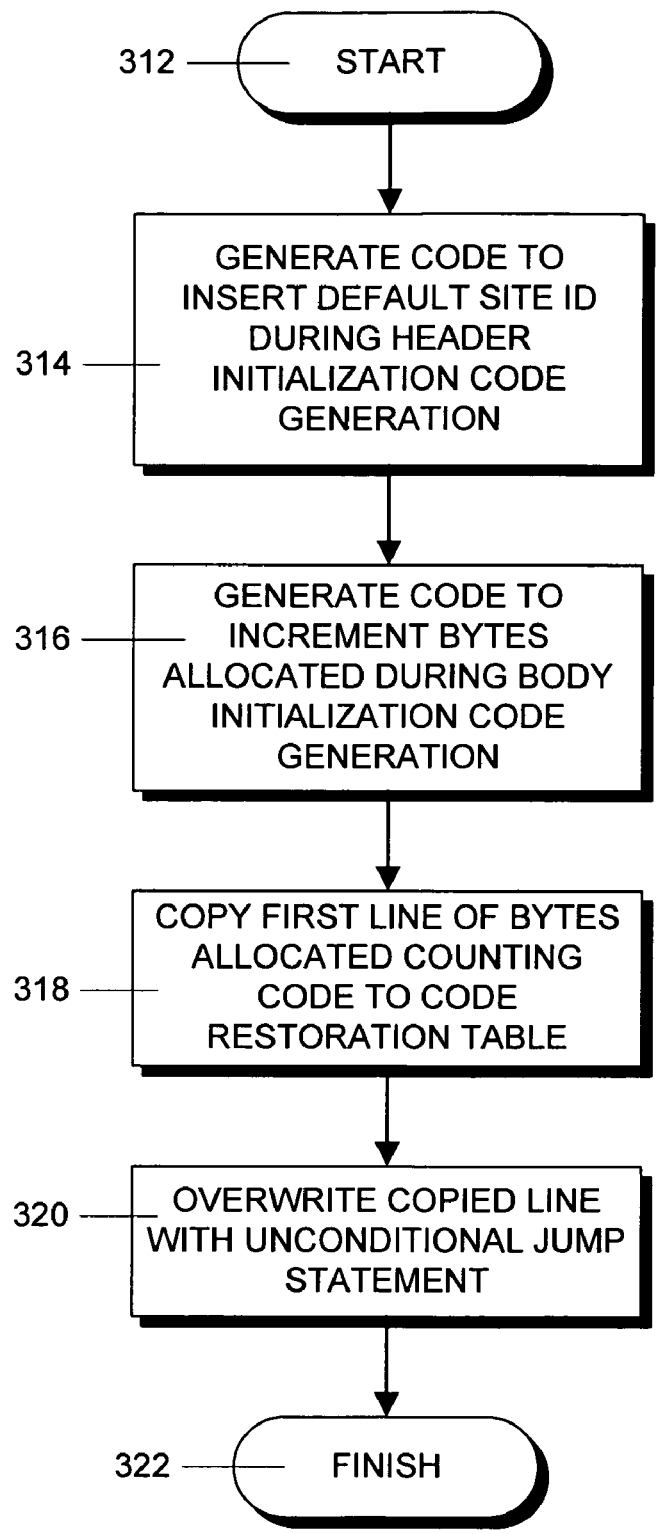
FIG. 3B is a flowchart showing the steps in an alternative illustrative compilation process performed by a compiler to generate object allocation code for a particular allocation site.

Other alternative arrangements exist for implementing the bytes allocated count update code. For example, as illustrated in FIGS. 2B and 3B, the compilation of the allocation code could also be modified to insert the bytes allocated counting code 212 at the end of the body initialization section 206. In FIG. 2B, elements that are the same as elements in FIG. 2A have been given the same numeral designations. This alternative process begins in step 312 and proceeds to step 314 where, as in the previous embodiment and during the generation of the header initialization section 204, additional code 210 is generated which inserts the default site identifier into the object header. The bytes allocated count update code 212 is then generated during the object body initialization code 206 as set forth in step 316. However, after generating this count update code 212, in step 318, the first instruction of this latter code 216 is copied to a code restoration table 222 as indicated schematically by arrow 220. Each entry in the code restoration table 222 is indexed by a global allocation site identifier 224 and contains the code statement 226 that has been copied from the count update code. Then, in step 320, the first count instruction is overwritten with an unconditional branch instruction 214 that causes the program to jump to the instruction after the counter-update code 212 as indicated schematically by arrow 228. Thus, the counting code is normally disabled, and incurs only a small overhead at runtime caused by the branch always instruction 214. The allocation code compilation process then finishes at step 322 after generating the object return code 208.

Figure 4:
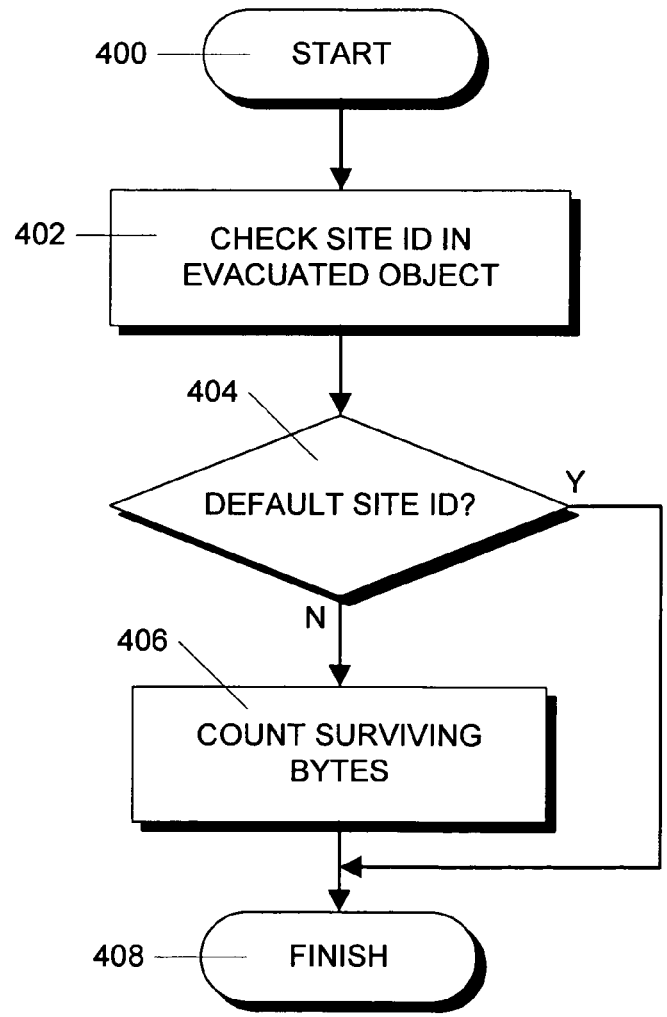
FIG. 4 is a flowchart showing illustrative steps performed by a collector when an object is promoted from the young generation to the old generation.
Figure 5:
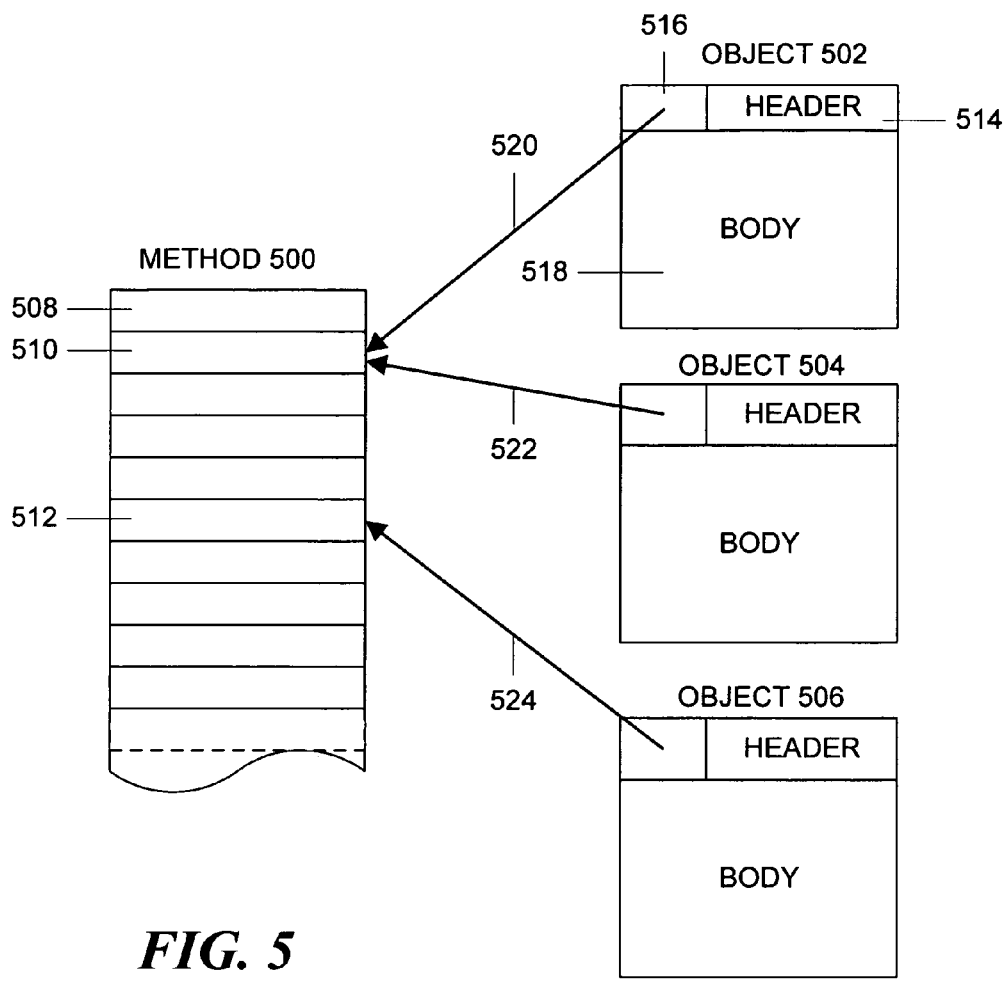
FIG. 5 is a block schematic diagram illustrating the insertion of a per class allocation site identifier into an object header.
Figure 6:
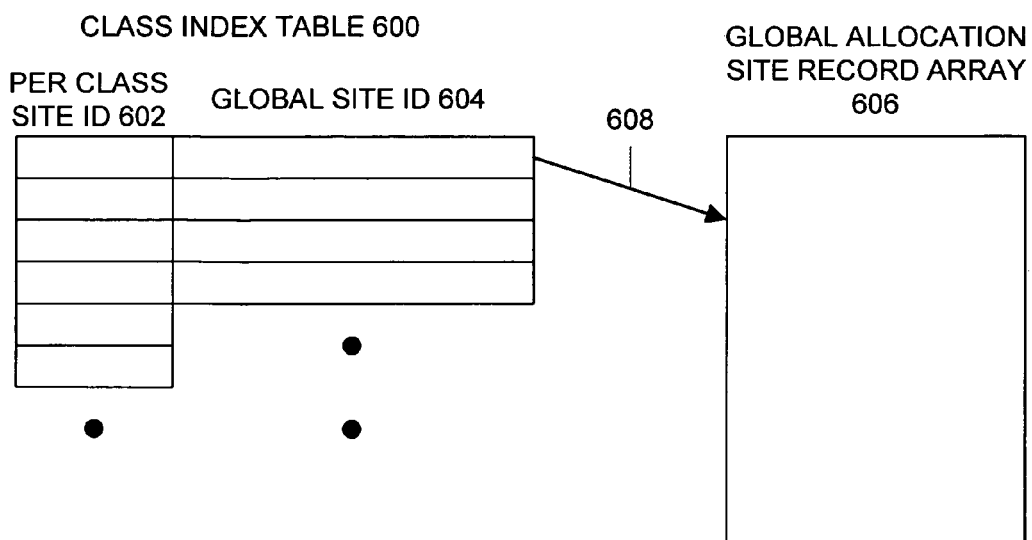
FIG. 6 is a block schematic diagram illustrating a class index table that is used to convert a per class allocation site identifiers into a global site identifier that is, in turn, used to access a global allocation site record array.

After the allocation code is generated, the operation of the system at runtime is described in connection with FIGS. 4, 5 and 6. In particular, the collector is modified to check the site identifier in the header of each object that it evacuates during a minor collection. The subroutine shown in FIG. 4 illustrates this process. The process starts in step 400 and proceeds to step 402 where the site identifier in the header of the evacuated object is checked. In step 404, a determination is made whether the object header contains the default site identifier that was assigned when the allocation site code was first compiled. If the object header contains the default site identifier, then the subroutine finishes in step 408 and any further processing for that object is completed in the normal fashion. This determination is the only constant overhead the inventive process imposes on the application program and this overhead is expected to be minimal.

As will be described in detail below, when an allocation site is selected as a candidate for pre-tenuring, the allocation code of that site is dynamically modified so that it inserts a unique allocation site identifier instead of the default site identifier into the object header of objects allocated at that site. For example, code section 210 shown in FIGS. 2A and 2B is modified to insert a unique site identifier into the header of each object allocated at that site. This arrangement is illustrated in FIG. 5 in which object 502 could be allocated from a site in method 500. Method 500 is comprised of sets of instructions that are schematically illustrated as instructions 508, 510 and 512. For example, if object 502 was allocated by an instruction or set of instructions 510 in method 500, a per-class identifier 516 is inserted into header 514 of object 502. Per class identifier 516 identifies the site 510 that allocated the object 502 as schematically illustrated by arrow 520. Another object 504 might be allocated by the same allocation site 510 in method 500, and the per class identifier in the header of that object 504 would also point to site 510 as schematically illustrated by arrow 522. The per-class identifiers of other objects identify the sites that allocated those objects. For example, if object 506 was allocated from site 512, then its per-class identifier would point to site 512 as schematically illustrated by arrow 524. Advantageously, since candidate sites can be identified by a mechanism that does not depend on being able to identify each allocation site directly from an object allocated from that site, site identifiers need only be inserted into the headers of objects allocated from candidate sites so that, as discussed below, surviving bytes from the candidate sites can be tracked. Since the number of such candidate sites is bounded, a table can be used to map a number assigned to each candidate site to the actual site identifier. Thus, the size of the site identifiers is also bounded by the number of candidate sites and site number overflows can be avoided.

Each allocation site is also assigned a global site identifier that is unique even across classes. A class index table is used to map per class site identifiers to the global site identifier as shown in FIG. 6. In FIG. 6, class index table 600 is indexed by per class site IDs 602. Each per class site ID is mapped to a global site ID 604 by table 600. Only allocations from "just-in-time" (JIT) compiled code are tracked. One allocation site identifier (per class and globally) is used to represent allocation from other sources, such as interpreted code, native code, reflection, etc. Each global site ID 604 is used to index into a global allocation site record array 606 as indicated schematically by arrow 608. The global allocation site record array is indexed by global allocation site IDs and tracks bytes allocated and surviving collection at each allocation site as will be discussed below. Array 606 is initialized to zero at the start of the garbage collection process.

Returning to FIG. 4, if, during a minor collection, the collector encounters an object where the site identifier in the object header is not the default site identifier as determined in step 404, then the surviving bytes are counted in step 406. In general, this is done by examining each object that survives collection and using the allocation site identifier in the object header to access the class index table 600 to obtain a corresponding global allocation site identifier 604. This global allocation site identifier is then used to access an entry in the global allocation site record array 606. The number of bytes in the object is then added to a surviving byte count in that entry.

Figure 7:
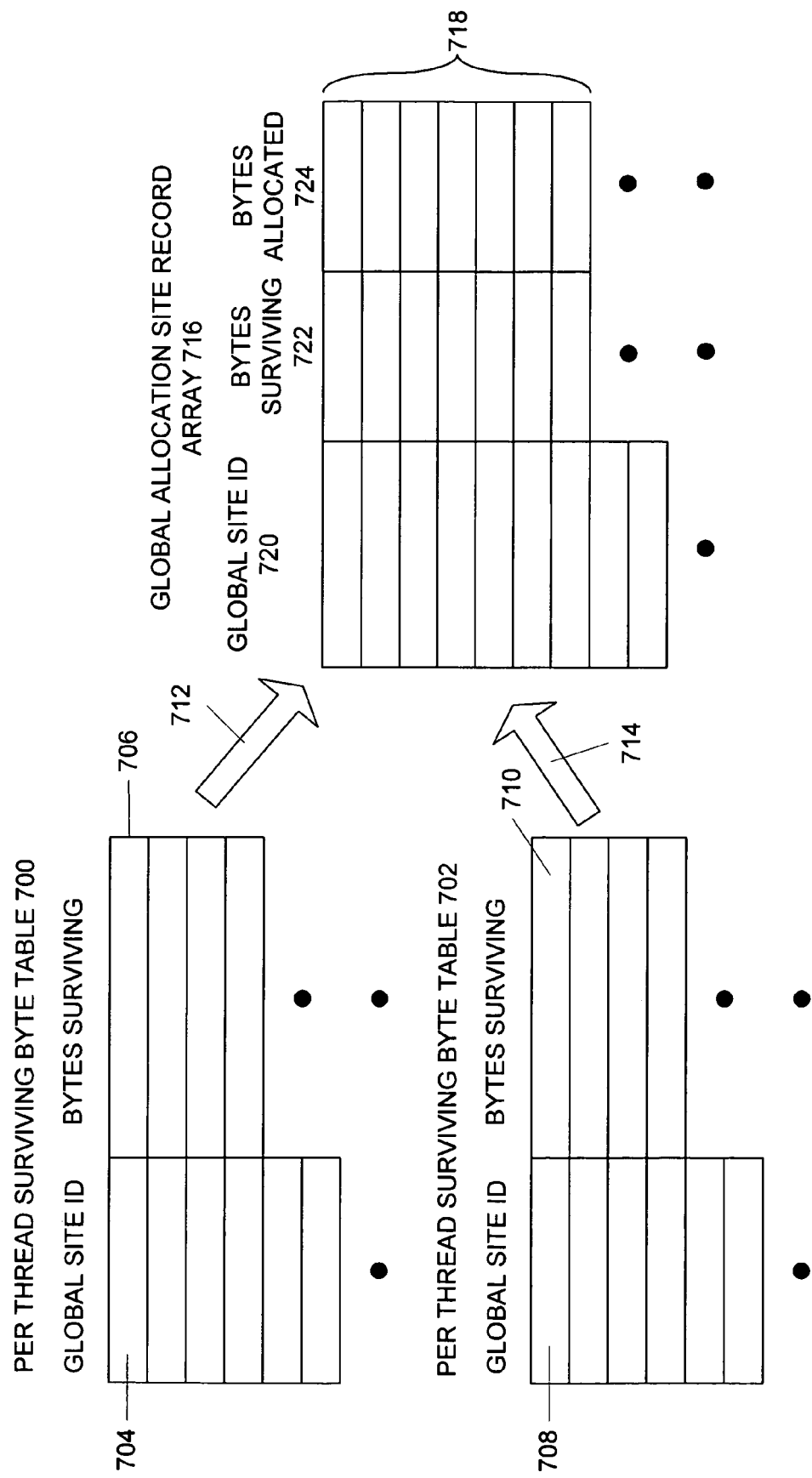
FIG. 7 is a block schematic diagram illustrating the combination of per-thread surviving byte tables into the global allocation site record array.

If garbage collection is being performed by parallel threads, each thread has a private array that maps global allocation site identifiers to a surviving byte count. At the end of a collection cycle, these per-thread tables are summed into the global allocation site record array. This process is illustrated schematically in FIG. 7. As shown, per-thread surviving byte table 700 and per-thread surviving byte table 702 are combined into global allocation site record array 716 as indicated by arrows 712 and 714. In particular, table 700 contains entries, each of which is indexed by a global site identifier 704 and has a count of the bytes surviving 706 for that site. Similarly, table 702 contains entries, each of which is indexed by a global site identifier 708 and has a count of the bytes surviving 710 for that site. Global allocation site record array 716 contains entries 718 each of which is indexed by a global site identifier 720 and has a bytes surviving count 722 and a bytes allocated count 724. When tables 700 and 702 are combined, the bytes surviving counts 706 and 710 are summed into the bytes surviving count 722 for the corresponding global site identifier 720 in table 716. The bytes allocated count is updated as described below. If only a single thread is performing garbage collection, then global allocation site record array 716 can be updated directly by the thread that increments the bytes surviving count 722 for each site.

In accordance with the principles of the invention, allocation sites are selected as candidates for pre-tenuring by examining the frequency of execution of those sites, the assumption being that sites that are frequently executed, allocate many bytes. These frequently-executed sites are the ones that will dramatically affect the behavior of the program: if some of these have high survival rates, it will be important to pre-tenure them. Infrequently-executed sites may also have high survival rates, but the effect of pre-tenuring (or failing to pre-tenure) these sites will be less dramatic. The frequency of execution may typically be obtained by other means. For example, conventional dynamic optimization systems gather information on code blocks that are frequently executed. An example of such an optimization system is the HotSpot JVM for the Java™ programming language. This latter optimization system is typically used to guide the selection of methods to optimize and to guide decisions within that optimization. However, this information can be reused to find allocation sites which are frequently executed. For example, all allocation sites in a frequently-executed code block could be considered as candidates for pre-tenuring. A predetermined number of sites with the highest frequency of execution or, alternatively, sites with a frequency of execution greater than a predetermined threshold are then selected as candidates for pre-tenuring.

Figure 8:
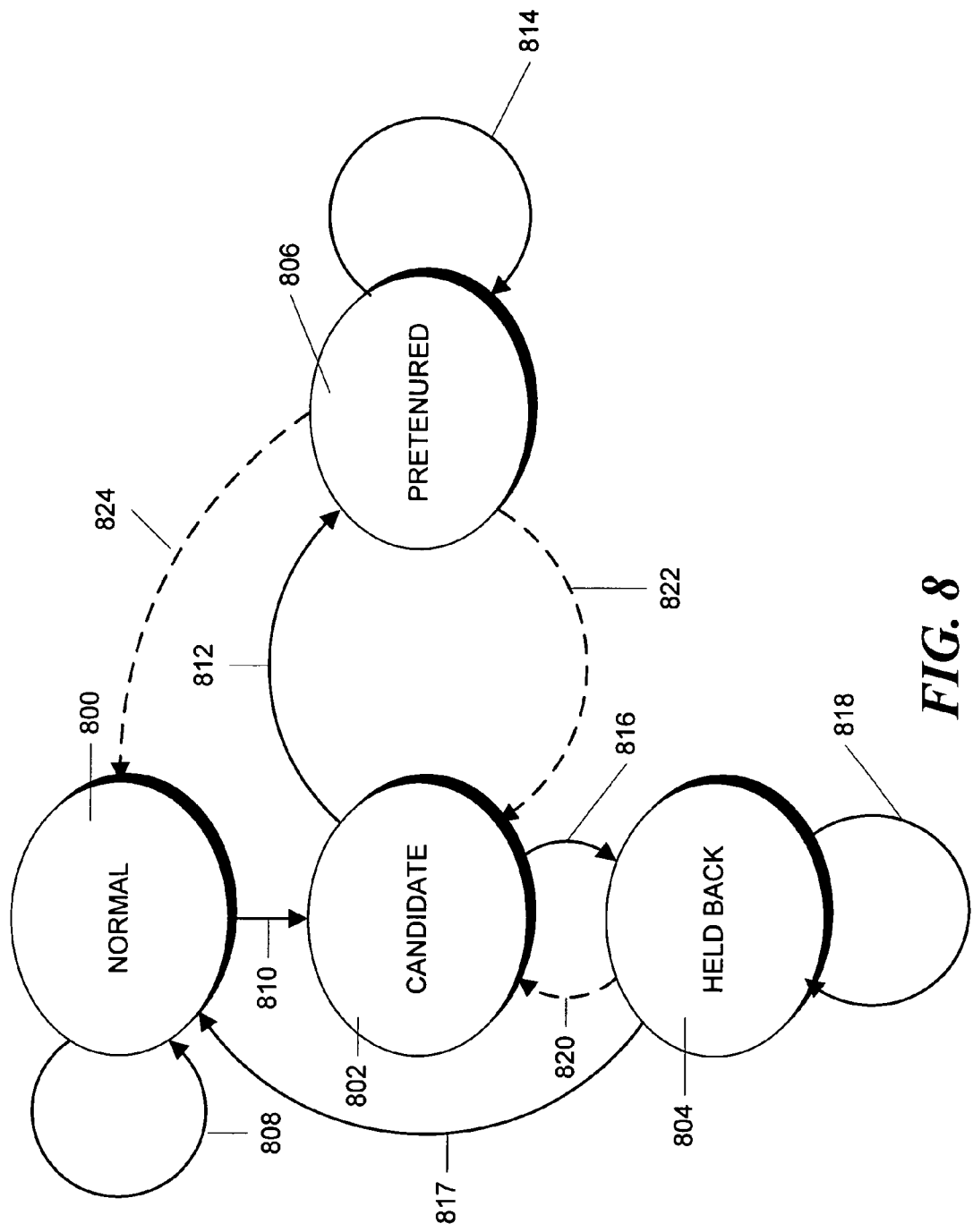
FIG. 8 is a state diagram showing various states in which an allocation site may be resident according to the principles of the invention.

Obviously, frequency of execution does not imply a high or low survival rate: a frequently-executed site could have a very low survival rate. Therefore, ranking high in frequency of execution during a collection cycle only qualifies an allocation site as a candidate for possible pre-tenuring. In accordance with the principles of the invention, a further evaluation of each candidate site is performed during subsequent young generation collections by counting bytes allocated by that candidate site between collection cycles in order to select candidate sites for actual pre-tenuring. This gives rise to several states in which an allocation site can exist during various collection cycles. These states are illustrated in the state diagram shown in FIG. 8.

These states include the "Normal" state 800, the "Candidate" state 802, the "Held Back" state 804 and the "Pre-tenured" state 806. When an allocation site is in a "Normal" state 800, objects are allocated in the heap memory area assigned to the young generation. In this state, the allocation site has not yet been considered as a pre-tenuring candidate. An allocation site may remain in state 800, as indicated schematically by arrow 808, if its frequency of execution does not cause it to be selected as a candidate site as discussed above.

If the frequency of execution of a site in a "Normal" state 800 is sufficiently high, then the site can progress to a "Candidate" state 802 as indicated by arrow 810. When a site is in a "Candidate" state 802, it has a non-default allocation site identifier, its surviving bytes are being counted and it will be further examined to determine how to classify it during a subsequent young-generation collection cycle.

If, in a subsequent collection cycle, the "Candidate" site 802 was found to allocate objects with a sufficiently high survival ratio, the site can progress to the "Pre-tenured" state 806 as indicated schematically by arrow 812. When a site in the "Pre-tenured" state 806, its allocation code is modified to allocate objects in the heap memory area assigned to the old generation. Once in a "Pre-tenured" state 806, a site may stay in that state indefinitely as indicated by arrow 814.

If, in a subsequent collection cycle, the "Candidate" site 802 was found not to allocate objects with a sufficiently high survival ratio, the site progresses to the "Held Back" state 804 as indicated by arrow 816. When a site is in the "Held Back" state 804, similar to a site in the "Normal" state 800, its allocation code allocates objects in the heap memory area assigned to the young generation. However, sites in a "Held Back" state are no longer considered as possible candidates for pre-tenuring. Once in a "Held Back" state 804, there are several options. The site may stay in the "Held Back" state 804 for a period of time as indicated by arrow 818 and then return to the normal state 800 as indicated by arrow 817. The period of time can be determined by counting to a predetermined number of young generation collections that have elapsed from the time that the site was designated as "Held Back." The period of time could also be a predetermined time interval that starts from the time that the site was designated as "Held Back." Alternatively, a site may stay in that state indefinitely as indicated by arrow 818.

Figure 9A:
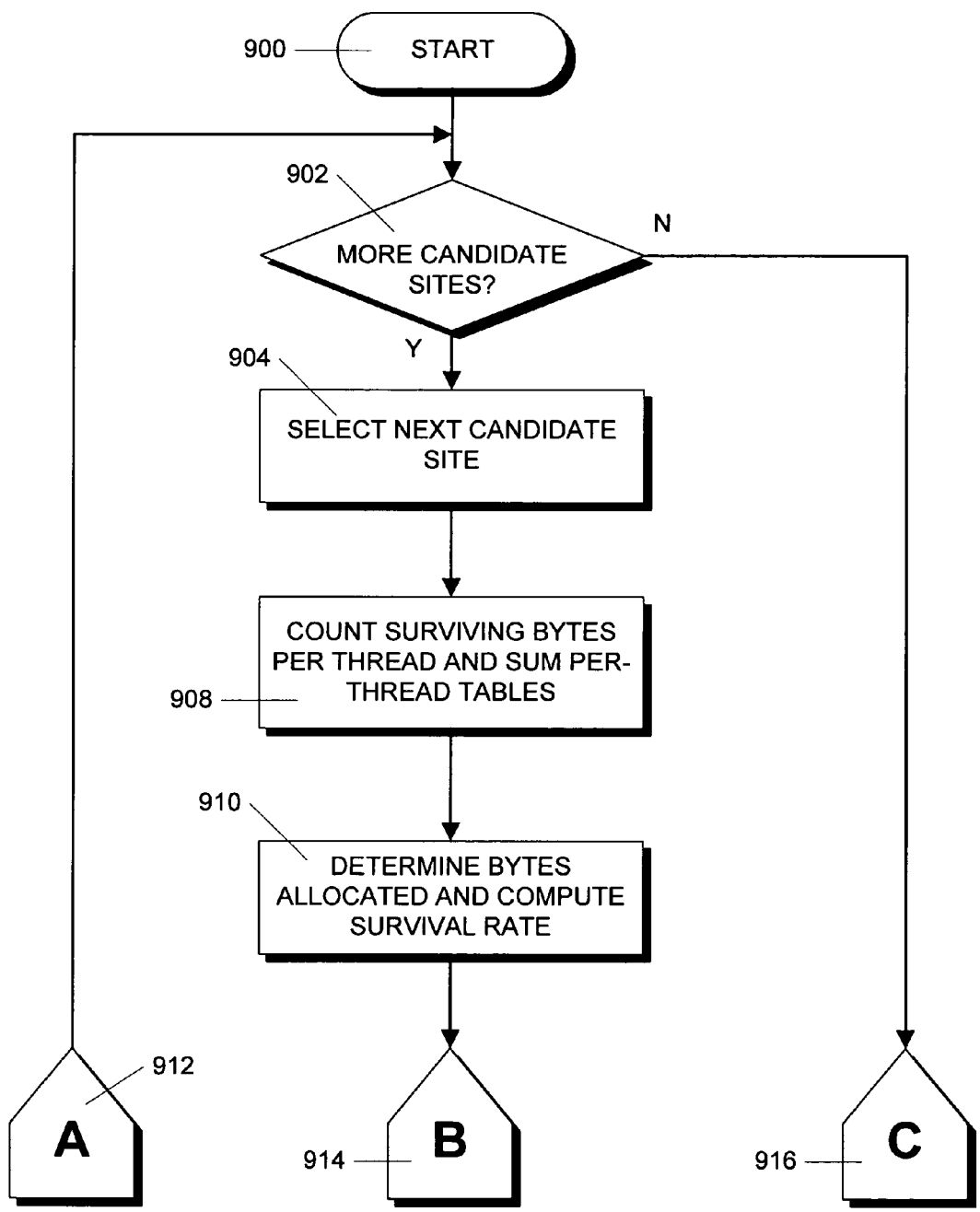
FIGS. 9A and 9B, when placed together, form a flowchart showing the steps in an illustrative runtime process for selecting allocation sites in order to pretenure objects allocated from those sites.
Figure 9B:
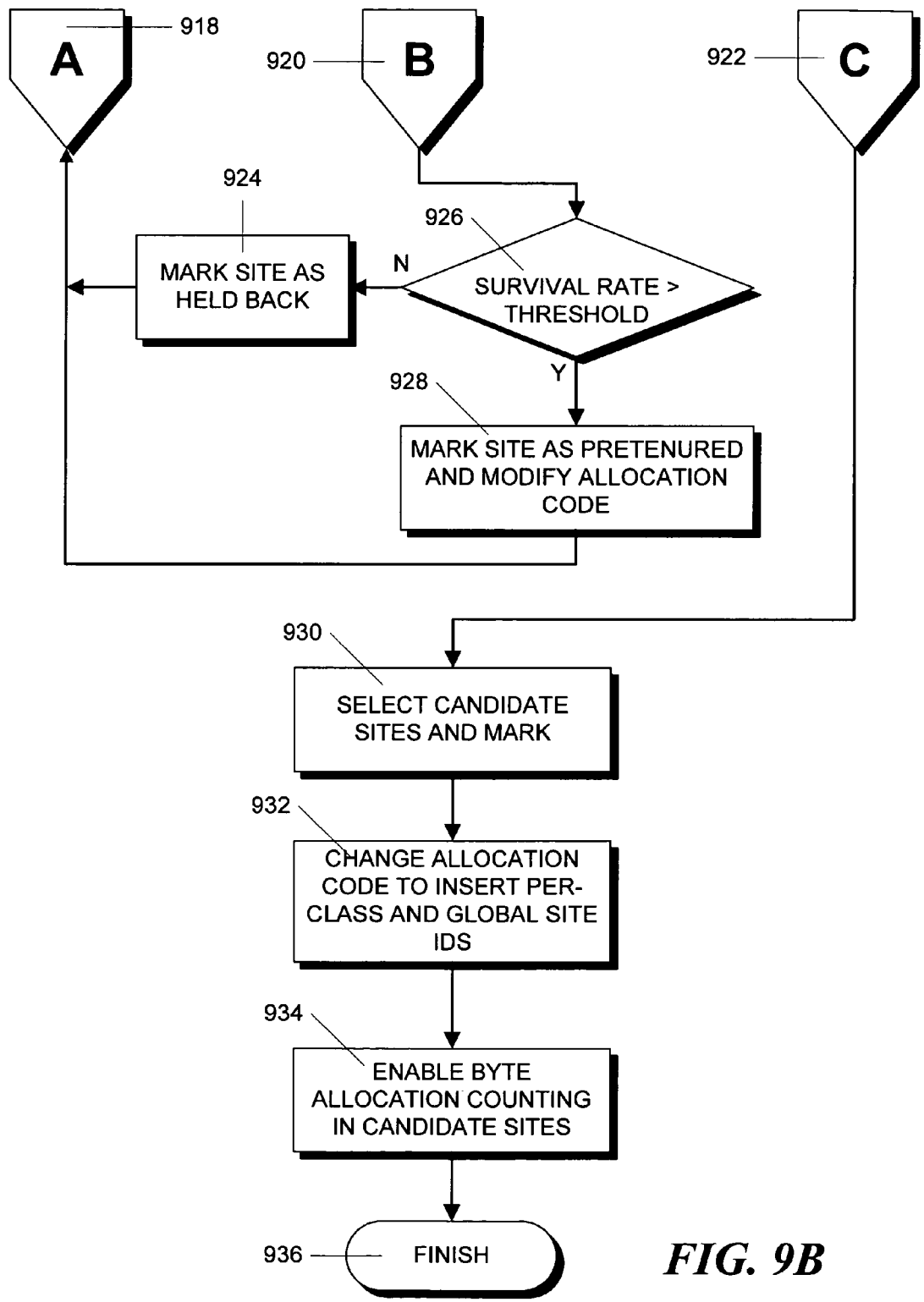

FIGS. 9A and 9B, which, when placed together, form a flowchart that shows the steps in an illustrative process for selecting candidate sites for pre-tenuring objects at the end of a young-generation collection. This process starts in step 900 and proceeds to step 902, where a determination is made whether additional candidate sites remain to be examined. If no additional candidate sites remain to be examined, the process proceeds, via off-page connectors 916 and 922, to step 930 where the sites are examined to determine whether any sites in a "Normal" state should progress to the "Candidate" state.

Candidate sites are then selected by choosing sites that meet a frequency of execution criteria as discussed above (excluding sites that are in a "Held Back" state, are already in a "Candidate" state or are in a "Pre-tenured" state) to place in a "Candidate" state as indicated in step 930. In step 932, the allocation code at these sites is then altered so that, when an object is instantiated from such a site, a per-class site identifier (or a candidate site number) is inserted into the object header instead of the default site identifier that was previously inserted into the object headers of objects allocated from those sites.

In addition, the bytes allocated at these candidate sites are then monitored between collection cycles. This monitoring is performed by enabling byte allocation counting at each candidate site as set forth in step 934. Byte allocation counting is enabled at each candidate site depending on the method used to implement the byte counting code. If a code stub is used as set forth in FIG. 2A, then the last initialization instruction 228 in the body initialization section 206 is overwritten with a branch always instruction that causes an unconditional jump to the last initialization instruction 232 in the code stub 230. The code stub 230 then executes and the branch always instruction 238 returns control to the object return code 208.

Alternatively, if the byte counting code is in-line, but bypassed as shown in FIG. 2B, then the counting code is activated by accessing the code restoration table 222 using the global allocation site identifier for that site and retrieving the code statement stored there previously during compilation. The retrieved code statement is then used to overwrite the unconditional branch statement placed at the start of the bytes allocated count update code during compilation.

At runtime, the bytes allocated count update code for each candidate site uses the global allocation site identifier for that site to access the global allocation site record array and add the number of bytes allocated to the bytes allocated count 724 (FIG. 7) for that site. The process then finishes in step 936.

However, if, in step 902, additional sites in a "Candidate" state remain to be examined the process proceeds to step 904 where the next site in a "Candidate" state to be processed is selected. Then, the process proceeds to step 908 and the succeeding steps, to examine the site to decide whether the site should be placed in a "Pre-tenured" state or a "Held Back" state. In particular, in step 908, the surviving bytes for the candidate site are obtained per thread and, if necessary, per thread tables are summed as discussed above in connection with FIG. 7. In step 910, the number of bytes allocated by the site from the time that the site was placed in the "Candidate" state until the present time is determined using the code arrangements discussed above with respect to FIGS. 2A, 2B and 3A, 3B. Note that the bytes allocated for a site in the "Candidate" state may be examined on the young generation collection immediately following the young generation collection during which the site entered the "Candidate" state or the bytes allocated at a site in the "Candidate" state may be summed over a predetermined number of young generation collections before the sum of the bytes allocated is examined (of course, the bytes surviving in that predetermined number of young generation collections must also be summed to determine an accurate survival rate.)

In particular, in step 910, the number of bytes allocated by a candidate site is determined by using the global allocation site identifier for that site to access the global allocation site record array and retrieve the bytes allocated count for the site. The survival rate for each candidate site is then calculated by dividing the bytes surviving by the bytes allocated.

The process then proceeds, via off-page connectors 914 and 920, to step 926 where a determination is made whether the calculated survival rate is greater than a predetermined threshold. Candidate sites whose survival rates exceed this threshold are placed in a "Pre-tenured" state as set forth in step 928. Placing a site in a "Pre-tenured" state involves marking the site as being in the "Pre-tenured" state and changing the memory allocation code generated for the allocation site to allocate memory space directly in heap memory area assigned to the old generation, rather than in the heap memory area assigned to the young generation. If care is taken with the code generation, the change in memory areas can be done simply by modifying immediate constants in the originally-generated instructions.

When a site is no longer in a "Candidate" state, the bytes allocated counting code can also be disabled in order to increase the overall efficiency of the code. If the bytes allocated code is in the form of a code stub 230, as shown in FIG. 2A, then the branch always instruction that causes a jump to the stub is overwritten by the last initialization instruction 232 found at the beginning of the stub 230. Alternatively, if the bytes allocated code is in-line, then it can be bypassed by overwriting the first counting instruction with a branch always instruction.

If, in step 926, it is determined that the survival rate for the site in the "Candidate" state is less than the predetermined threshold, the site is marked to place it in a "Held Back" state in step 924. As previously mentioned, sites in a "Held Back" state are not considered for future progression to the "Candidate" state. It is also possible to use a second lower threshold to determine which sites should be placed in the "Held Back" state. In this case, "intermediate" sites with survival rates between the two thresholds could be monitored for a while before making a decision in order to increase the confidence of the decision. As described above, the bytes allocated counting code can also be disabled to prevent it from slowing the overall operation of the application.

From either step 924 or 928, the process proceeds, via off-page connectors 918 and 912, back to step 902 to determine whether further sites remain to be examined.

The aforementioned process enables counting of bytes allocated at allocation sites in the "Candidate" state between two young generation collections using a global allocation site record array 716 that maps global allocation site identifiers to array records of which one field is used to record a count of allocated bytes for an allocation site. Code can easily be generated to increment the allocated bytes field of an entry in such an array by the size of an allocated object if a single-threaded programming language is used. However, in a multi-threaded environment, such incrementing code becomes more difficult to generate and runs slower. For example, the array entry can be locked during the incrementing operation or atomic instructions such as fetch-and-add or compare-and-swap can be used to store the results of the increment, but these alternatives can slow the operation of the program considerably, especially if an allocation site is popular and their use causes contention. Even if atomic techniques are not used, thereby allowing some increments to be lost in the case of a conflict, cache memory line contention still may have deleterious effects on performance.

One way to avoid the performance penalties introduced by atomic operations is to maintain a matrix mapping pairs of global allocation site identifiers and thread IDs to allocated byte counts. However, such matrices could consume significant memory space, since the number of application threads may be large. Further, the expense of summing the per-thread matrix entries at the next collection can also be significant.

Figure 10:
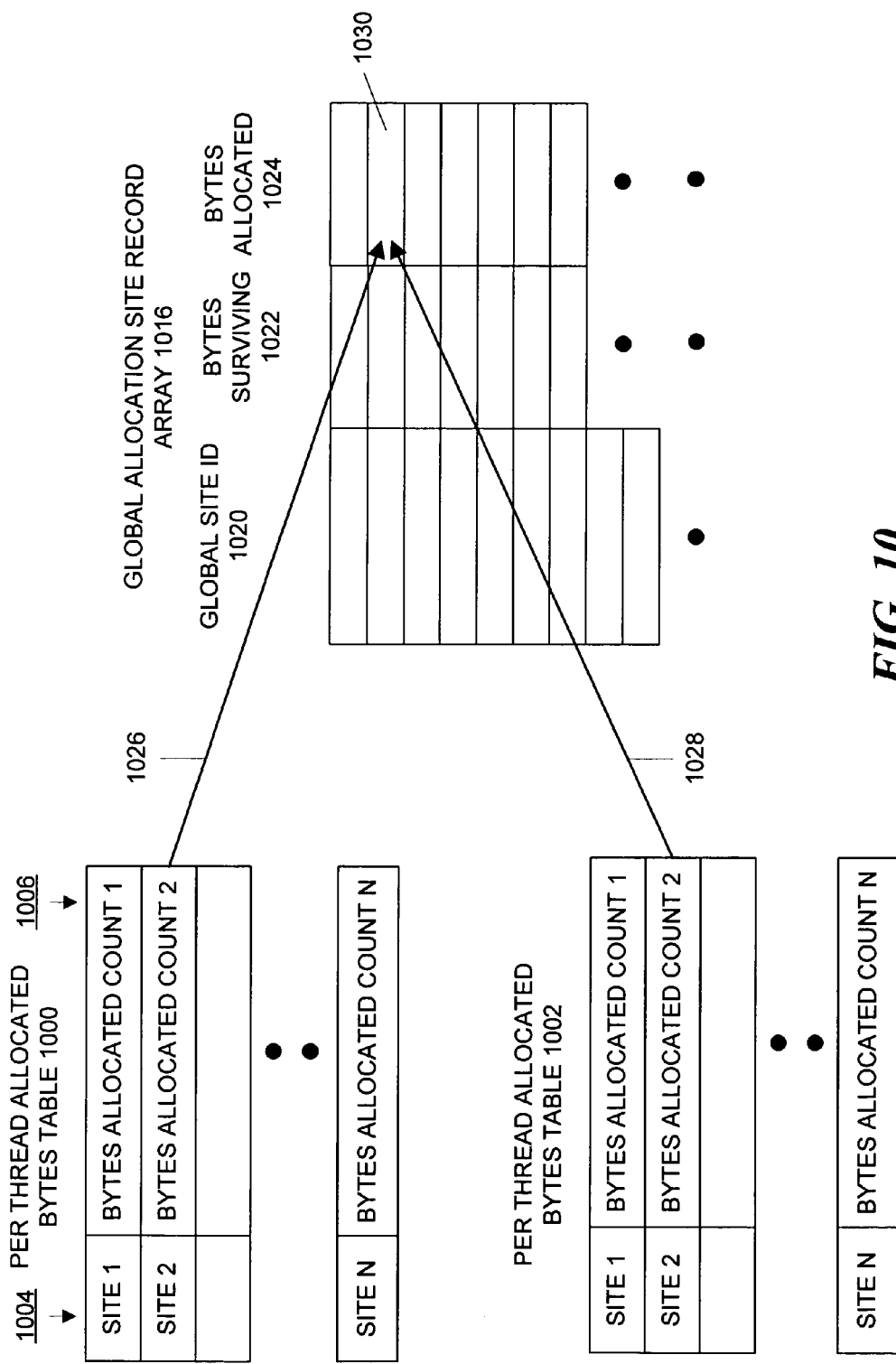
FIG. 10 is a block schematic diagram illustrating the use of thread-local arrays to eliminate atomic operations and locks in updating bytes allocated counts for allocation sites.

In accordance with the principles of the invention, a modified matrix approach takes advantage of the fact that byte allocations are being counted for only a small number of candidate sites (the number of byte allocation counting sites is bound, for example, by N, the total number of sites in the "Candidate" state at any given time). Specifically, an N-entry array of allocated byte counts is provided for each application thread as shown in FIG. 10 which illustrates the arrays 1000 and 1002 for two threads. For example, the array may be contained in a structure representing the application thread. Each array is indexed by a site number 1004 and contains a bytes allocated count 1006 for that site and each array is bounded by the total number of sites in the "Candidate" state which is assumed to be "N" in this example. In addition, since each array is local to the thread that contains it, each thread can write into its array without using atomic operations or locks.

Figure 11:
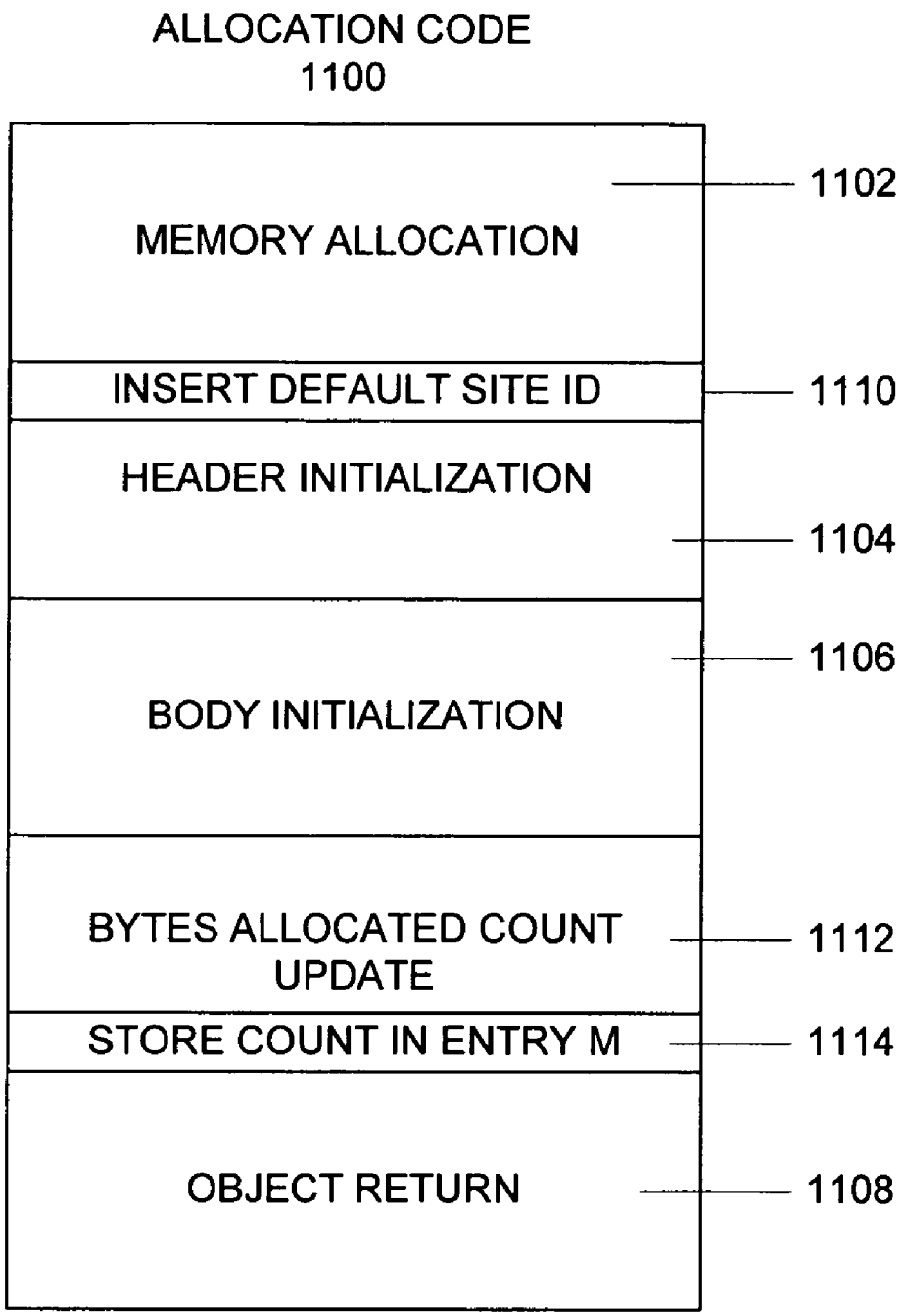
FIG. 11 is a block schematic diagram illustrating modifications that are made to object allocation code to count bytes allocated at a particular allocation site by a thread in a multithreaded system.

Then, during compilation, the allocated byte counting code is generated in a manner that it updates one of the array entries. In particular, the allocated byte counting code can be generated so that it can be easily modified to update any of the N entries, for example, by altering immediate operands in one or more instructions. When an allocation site is placed in the "Candidate" state, it is assigned one of these N candidate site identifiers, and its allocation code is altered to update the appropriate thread-local count. This alteration is illustrated in FIG. 11 which shows in schematic form the byte allocation counting code 1100. This code is similar to that illustrated in FIG. 2B and comprises memory allocation code 1102, header initialization code 1104, body initialization code 1106 and object return code 1108. As illustrated in FIG. 2B, the header initialization code 1104 has been modified to add code that inserts the allocation site ID into the object header as indicated at 1110. Further, the body initialization code is modified to insert the bytes allocated count update code 1112. Code 1112 is further modified as indicated at 1114 to store the resulting bytes allocated count in entry M that has been assigned to that allocation site. A similar modification can be made to the bytes allocated counting stub code shown in FIG. 2A.

Then, during the next collection cycle, the thread-local bytes allocated counts are summed, and the allocated byte counts are attributed to the corresponding allocation sites. This is illustrated schematically by arrows 1026 and 1028, which indicate that the bytes allocated count for allocation site 2 are summed to update the bytes allocated count 1024 for site 1030 in the global allocation site record array 1016.

Many variations on the aforementioned process are possible. For example, since the inventive process samples every object allocation at an allocation site for a short period of time, it might be affected by certain behaviors where the allocation behavior of the application program changes over medium-range time granularities. If such a change causes a site in the "Normal" state to become a site in the "Candidate" state, the process is not affected. In another embodiment, the bytes allocated count that caused a site to be placed in the "Held Back" state is stored. If the survival rate of that site later increases, the number of surviving bytes for that site might become larger. If the number is sufficiently large, the state of the site in the "Held Back" state to the "Candidate" state as schematically indicated by dotted arrow 820 in FIG. 8.

Other situations are more difficult to detect. For example, such a situation might arise with a site whose allocated byte survival rate was high when it was sampled, and it was therefore placed in a "Pre-tenured" state. If the allocated byte survival rate later becomes lower, the state of that site might best be modified to "Normal" in order to allocate objects in the young generation. There are several approaches that can be taken to detect such allocation sites. Another embodiment reverses pre-tenuring decisions at regular intervals, changing the state of sites in the "Pre-tenured" state back to the "Normal" state as indicated by dotted arrow 824 in FIG. 8 (or perhaps directly to the "Candidate" state, as indicated by dotted arrow 822.) If the behavior of one of these sites still justifies pre-tenuring, it will quickly be re-identified. In this embodiment, it may be best to revert only a small number (perhaps one) of the sites in a "Pre-tenured" state at a time.

Other embodiments with more directed approaches assume that it is possible to distinguish between pre-tenured allocation and normal promotion allocation in the old generation. If these two types of promotion can be distinguished, in one embodiment when the old-generation occupancy that will cause the old generation to be collected is approached, allocation counting for some set of pre-tenured allocation sites could be re-enabled. After old generation "liveness" is determined, the surviving bytes are counted for each allocation site that is being sampled, in order to obtain a survival rate estimate. If this estimate is less than the pre-tenuring threshold, then the site is reverted from "Pre-tenured" to "Normal." (For this to meaningfully predict survival rates if pre-tenuring of the allocation site were reverted, the amount of counted allocation should be similar to the young generation size.)

One further embodiment also counts surviving objects by allocation in a young-generation-sized area of the old-generation that is being filled by allocation from pre-tenured objects. Instead of enabling counting when this area is filled however, this embodiment estimates the expected bytes surviving from the allocation and survival rates computed when the site was in a "Candidate" state and reverses the pre-tenuring decision if the actual amount surviving for a site is sufficiently smaller than the estimate.

In some cases, it is desirable to directly identify sites with low survival ratio. Since the inventive system considers sites as candidates for pre-tenuring based on the frequency in which they are executed, it also has the advantage that it will be able to directly identify sites with any survival ratio, as long as a site is executed often.

A software implementation of the above-described embodiment may comprise a series of computer instructions fixed on a tangible medium, such as a computer readable media, for example, a diskette, a CD-ROM, a ROM memory, or a fixed disk. The series of computer instructions embodies all or part of the functionality previously described herein with respect to the invention. Those skilled in the art will appreciate that such computer instructions can be written in a number of programming languages for use with many computer architectures or operating systems. Further, such instructions may be stored using any memory technology, present or future, including, but not limited to, semiconductor, magnetic, optical or other memory devices. It is contemplated that such a computer program product may be distributed as a removable media with accompanying printed or electronic documentation, e.g., shrink wrapped software, preloaded with a computer system, e.g., on system ROM or fixed disk, or distributed from a server or electronic bulletin board over a network, e.g., the Internet or World Wide Web.

Although an exemplary embodiment of the invention has been disclosed, it will be apparent to those skilled in the art that various changes and modifications can be made which will achieve some of the advantages of the invention without departing from the spirit and scope of the invention. For example, it will be obvious to those reasonably skilled in the art that, in other implementations, different criteria may be used to make the pre-tenuring decisions. In addition, instead of selecting a fixed, predetermined number of allocation sites with the highest frequency of execution as candidate sites, some sites may be eliminated from the list of potential candidate sites if their frequency of execution is below some predefined threshold. This reduces the number of sites that must be monitored and thereby reduces overhead. The order of the process steps may also be changed without affecting the operation of the invention. Other aspects, such as the specific process flow, as well as other modifications to the inventive concept are intended to be covered by the appended claims.

What is claimed is:

1. A method for pre-tenuring new object memory allocation in a generational garbage collector, comprising:

determining, using a dynamic profiling technique, a frequency of execution of a plurality of code blocks;

selecting a plurality of allocation sites within the plurality of code blocks, wherein each of the plurality of allocation sites is a point within the plurality of code blocks where an object is instantiated, wherein instantiation of the object allocates memory space for the object;

determining a frequency of execution of the plurality of allocation sites;

initiating a memory collection of a first young generation;

selecting a plurality of candidate sites with highest frequencies of execution from the plurality of allocation sites, wherein the remaining allocation sites comprise non-selected allocation sites, and wherein a frequency of execution of the plurality of candidate sites allocates more bytes than a frequency of execution of the non-selected allocation sites;

completing the memory collection of the first young generation;

initiating a memory collection of a second young generation after the completion of the memory collection of the first young generation;

counting bytes allocated to each of the plurality of candidate sites after initiating the memory collection of the second young generation;

determining, for each of the plurality of candidate sites, a survival rate of allocated bytes that survive memory collection based on counting bytes allocated; and storing to an older generation in a memory heap a plurality of objects from the plurality of candidate sites with survival rates greater than a predetermined threshold.

2. The method of claim 1, wherein counting allocated bytes initiates after the plurality of candidate sites are selected.

3. The method of claim 1, further comprising:

terminating counting allocated bytes for one of the plurality of candidate sites when the survival rate is greater than the predetermined threshold.

4. The method of claim 1, wherein the number of candidate sites selected is predetermined.

5. The method of claim 1, further comprising:

placing one of the plurality of candidate sites with survival rate less than the predetermined threshold in a held back state; and removing the site from the plurality of candidate sites.

6. The method of claim 5, further comprising:
terminating counting allocated bytes for one of the plurality of candidate sites when the site is removed from the plurality of candidate sites.

7. The method of claim 5, further comprising:
removing one of the plurality of allocation sites with survival rate greater than the predetermined threshold from the held back state; and
placing the site in the plurality of candidate sites.

8. An apparatus for pre-tenuring new object memory allocation in a generational garbage collector, comprising:
a memory module;
a mechanism, resident in memory, that determines, using a dynamic profiling technique, a frequency of execution of a plurality of code blocks;
a mechanism, resident in memory and operable for the plurality of code blocks, that selects a plurality of allocation sites within the plurality of code blocks, wherein each of the plurality of allocation sites is a point within the plurality of code blocks where an object is instantiated, wherein instantiation of the object allocates memory space for the object;
a mechanism, resident in memory and operable for the plurality of allocation sites, that determines a frequency of execution of each of the plurality of allocation sites;
a mechanism, resident in memory and operable during a first young generation collection, that selects a plurality of candidate sites from the plurality of allocation sites with highest frequencies of execution, wherein the remaining allocation sites comprise non-selected allocation sites, and wherein a frequency of execution of the plurality of candidate sites allocates more bytes than a frequency of execution of the non-selected allocation sites;
a mechanism, resident in memory and operable during a second young generation collection occurring after the first young generation collection, that counts bytes allocated by each of the plurality of candidate sites between young generation memory collections, and that determines, for each of the plurality of candidate sites, a survival rate of bytes allocated that survive memory collection based on based on counting bytes allocated; and
a mechanism, resident in memory, that stores to an older generation in a memory heap a plurality of objects from the plurality of candidate sites with survival rates greater than a predetermined threshold.

9. The apparatus of claim 8, wherein the mechanism that counts bytes allocated by one of the plurality of candidate sites between young generation collections is generated at compile time.

10. The apparatus of claim 8, wherein the mechanism counts bytes allocated by one of the plurality of candidate sites between young generation collections after the site is selected as one of the plurality of candidate sites.

11. The apparatus of claim 10, further comprising:
a mechanism, resident in memory, that ends counting allocated bytes for one of the plurality of candidate sites when the survival rate for the site is greater than the predetermined threshold.

12. The apparatus of claim 8, further comprising:
placing one of the plurality of candidate sites with survival rate less than the predetermined threshold in a held back state; and
removing the site from the plurality of candidate sites.

13. The apparatus of claim 12, further comprising:
removing one of the plurality of allocation sites with survival rate greater than the predetermined threshold from the held back state; and
placing the site in the plurality of candidate sites.

14. A computer readable medium storing instructions to pre-tenure new object memory allocation in a generational garbage collector, the instructions comprising functionality to:
determine, using a dynamic profiling technique, a frequency of execution of a plurality of code blocks;
select a plurality of allocation sites within the plurality of code blocks, wherein each of the plurality of allocation sites is a point within the plurality of code blocks where an object is instantiated, wherein instantiation of the object allocates memory space for the object;
determine a frequency of execution of the plurality of allocation sites;
initiate a memory collection of a first young generation;
select a plurality of candidate sites with highest frequencies of execution from the plurality of allocation sites, wherein the remaining allocation sites comprise non-selected allocation sites, and wherein a frequency of execution of the plurality of candidate sites allocates more bytes than a frequency of execution of the non-selected allocation sites;
complete the memory collection of the first young generation;
initiate a memory collection of a second young generation after the completion of the memory collection of the first young generation;
count bytes allocated to each of the plurality of candidate sites after initiating the memory collection of the second young generation;
determine, for each of the plurality of candidate sites, a survival rate of allocated bytes that survive memory collection based on counting bytes allocated; and
store to an older generation in a memory heap a plurality of objects from the plurality of candidates sites with survival rates greater than a predetermined threshold.

15. The computer readable medium of claim 14, the instructions further comprising functionality to:
place one of the plurality of candidate sites with survival rate less than the predetermined threshold in a held back state; and
remove the site from the plurality of candidate sites.

* * * * *